United States Patent
Shnyr (10) Patent No.: US 9,459,105 B2
(45) Date of Patent: Oct. 4, 2016

(54) METHOD, APPARATUS AND COMPUTER PROGRAM PRODUCT FOR COMMUNITY BASED USER INVOLVEMENT IN MAP UPDATING

(75) Inventor: Andriy Shnyr, Berlin (DE)

(73) Assignee: HERE Global B.V., Veldhoven (NL)

( * ) Notice: Subject to any disclaimer, the term of this patent is extended or adjusted under 35 U.S.C. 154(b) by 1564 days.

(21) Appl. No.: 12/276,802

(22) Filed: Nov. 24, 2008

(65) Prior Publication Data

US 2010/0131193 A1   May 27, 2010

(51) Int. Cl.
*G08G 1/123* (2006.01)
*G01C 21/32* (2006.01)

(52) U.S. Cl.
CPC ..................................... *G01C 21/32* (2013.01)

(58) Field of Classification Search
CPC ...................................................... G01C 21/32
USPC ...................................... 701/208, 532; 707/3
See application file for complete search history.

(56) References Cited

U.S. PATENT DOCUMENTS

2006/0238382 A1* 10/2006 Kimchi et al. ............. 340/995.1
2007/0124064 A1*  5/2007 Fukui et al. .................. 701/208
2007/0219958 A1*  9/2007 Park et al. ......................... 707/3

FOREIGN PATENT DOCUMENTS

CN          1300032 A     6/2001

OTHER PUBLICATIONS

IBM Technical Disclosure, Superior Application of Wiki Capabilities to Mapping Systems, Jun. 8, 2006.*

* cited by examiner

*Primary Examiner* — Luke Gilligan
(74) *Attorney, Agent, or Firm* — Ditthavong & Steiner, P.C.

(57) ABSTRACT

A method for employing community based user involvement in map updating may include receiving an update request indicating a feature requested to be changed at a corresponding location on a map, determining a community associated with the update request, providing an indication of the update request to a plurality of members of the community, and providing for updating of the map according to the update request based on responses received from the members of the community. A corresponding computer program product and apparatus are also provided.

18 Claims, 7 Drawing Sheets

METHOD, APPARATUS AND COMPUTER PROGRAM PRODUCT FOR COMMUNITY BASED USER INVOLVEMENT IN MAP UPDATING

TECHNOLOGICAL FIELD

Embodiments of the present invention relate generally to map services technology and, more particularly, relate to a method, apparatus and computer program product for employing community based user involvement in map updating.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. Alternatively, the network device may respond to commands or request made by the user (e.g., content searching, mapping or routing services, etc.). The services may be provided from a network server or other network device, or even from the mobile terminal such as, for example, a mobile telephone, a mobile navigation system, a mobile computer, a mobile television, a mobile gaming system, etc.

Due to the ubiquitous nature of mobile electronic devices, people of all ages and education levels are now utilizing mobile terminals to communicate with other individuals or contacts, receive services and/or to share information, media and other content. Additionally, given recent advances in processing power, battery life, the availability of peripherals such as global positioning system (GPS) receivers and the development of various applications, mobile electronic devices are increasingly used by individuals for receiving mapping or navigation services in a mobile environment. For example, cellular telephones and other mobile communication devices may be equipped with GPS and may be able to provide routing services based on existing map information and GPS data indicative of the location of the cellular telephone or mobile communication device of a user.

Despite the great utility of enabling mobile users to utilize mapping or navigation services, a common problem related to providing such services relates to the availability and/or maintenance of maps that are up to date or current. The routine maintenance, construction, and/or development of roads or other travel routes, which may experience change on a nearly continuous basis in some regions, may make it a challenging or expensive undertaking to maintain current maps upon which to base the provision of such services. Additionally, in some remote areas, the infrequency of such changes, or the lack of demand for routine updates to maps may make the updating of such maps non-viable from an economic standpoint. Thus, the provision of good service could be expensive, while a failure to update maps may result in users developing a low opinion of the service provided.

Some developments have been made aimed at enabling the users of devices with positioning capabilities to share information that can be used to update map services. In this regard, for example, the there are services which enable users to manually upload changes they detect to the system. Service staff may then verify the uploaded changes for use by other service users to update their maps. This type of updating requires a relatively large amount of resources for verification by the network side (e.g., sending out personnel to verify the change) and usually enables update intervals on the order of every month. However, more rapid response to change requests may be desirable in some cases.

Accordingly, it may be desirable to provide an improved mechanism by which maps may be updated.

BRIEF SUMMARY

A method, apparatus and computer program product are therefore provided to enable map updating, in some cases, in a more responsive manner. In this regard, for example, map update requests may be provided by a particular individual and other users (e.g., members of the same community as the particular individual or members of a community likely to be impacted by a proposed update submitted by the particular individual) may provide information useful in determining whether the map update requests provided by the particular individual should be accepted and used for updating relevant maps.

In one exemplary embodiment, a method of employing community based user involvement in map updating is provided. The method may include receiving an update request indicating a feature requested to be changed at a corresponding location on a map, determining a community associated with the update request, providing an indication of the update request to a plurality of members of the community, and providing for updating of the map according to the update request based on responses received from the members of the community.

In another exemplary embodiment, a computer program product for employing community based user involvement in map updating is provided. The computer program product includes at least one computer-readable storage medium having computer-executable program code instructions stored therein. The computer-executable program code instructions may include program code instructions for receiving an update request indicating a feature requested to be changed at a corresponding location on a map, determining a community associated with the update request, providing an indication of the update request to a plurality of members of the community, and providing for updating of the map according to the update request based on responses received from the members of the community.

In another exemplary embodiment, an apparatus for employing community based user involvement in map updating is provided. The apparatus may include a processor. The processor may be configured to receive an update request indicating a feature requested to be changed at a corresponding location on a map, determine a community associated with the update request, provide an indication of the update request to a plurality of members of the community, and provide for updating of the map according to the update request based on responses received from the members of the community.

In an alternative exemplary embodiment, a method of employing community based user involvement in map updating is provided. The method may include receiving, based on being a member of a community associated with an update request, an indication of the update request at a terminal. The update request may provide a feature requested to be changed at a corresponding location on a map. The method may further include providing a response regarding confirmation of the update request, and receiving an update of the map according to the update request in response to confirmation of the update request.

In another exemplary embodiment, a computer program product for employing community based user involvement in map updating is provided. The computer program product includes at least one computer-readable storage medium having computer-executable program code instructions stored therein. The computer-executable program code instructions may include program code instructions for receiving, based on being a member of a community associated with an update request, an indication of the update request at a terminal. The update request may provide a feature requested to be changed at a corresponding location on a map. Further program code instructions may be included for providing a response regarding confirmation of the update request, and receiving an update of the map according to the update request in response to confirmation of the update request.

In another exemplary embodiment, an apparatus for employing community based user involvement in map updating is provided. The apparatus may include a processor. The processor may be configured to receive, based on being a member of a community associated with an update request, an indication of the update request at a terminal. The update request may provide a feature requested to be changed at a corresponding location on a map. The processor may be further configured to provide a response regarding confirmation of the update request, and receive an update of the map according to the update request in response to confirmation of the update request.

Embodiments of the invention may provide a method, apparatus and computer program product for employment in mobile environments in which mapping or routing services are provided. As a result, for example, mobile terminal users may enjoy an improved mapping or routing service on the basis of maps that are updated using information provided by other mobile terminal users.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 3 (which includes FIGS. 3A and 3B) illustrates an example of an indication of an updated map portion according to an exemplary embodiment of the present invention;

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Figure 1:
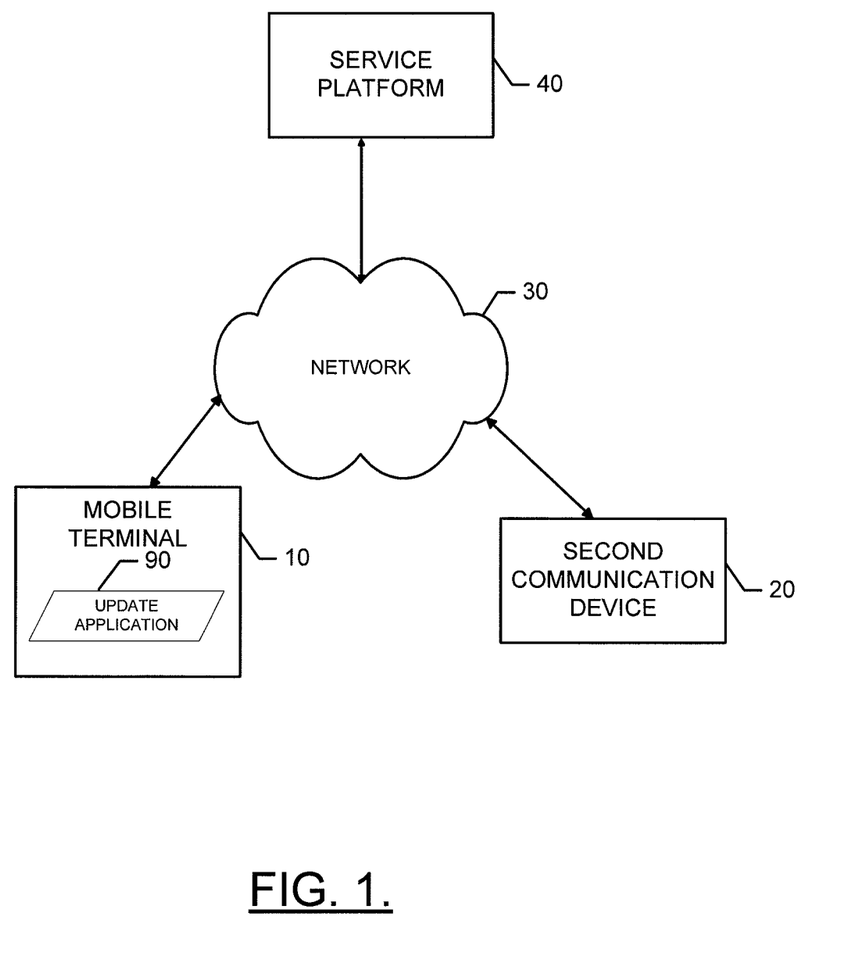
FIG. 1 is a schematic block diagram of a wireless communications system according to an exemplary embodiment of the present invention.

FIG. 1 illustrates a generic system diagram in which a device such as a mobile terminal 10, which may benefit from embodiments of the present invention, is shown in an exemplary communication environment. As shown in FIG. 1, a system in accordance with an example embodiment of the present invention includes a first communication device (e.g., mobile terminal 10) and a second communication device 20. The second communication device 20 is provided as an example to illustrate potential multiplicity with respect to instances of other devices that may be included in the network 30. The communications devices of the system may be able to communicate with network devices or with each other via a network 30. In some cases, the network devices with which the communication devices of the system communicate may include a service platform 40. In an exemplary embodiment, the mobile terminal 10 (and/or the second communication device 20) is enabled to communicate with the service platform 40 to provide, request and/or receive information.

In some embodiments, not all systems that employ embodiments of the present invention may comprise all the devices illustrated and/or described herein. While several embodiments of the mobile terminal 10 may be illustrated and hereinafter described for purposes of example, other types of mobile terminals, such as portable digital assistants (PDAs), pagers, mobile televisions, mobile telephones, gaming devices, laptop computers, cameras, camera phones, video recorders, audio/video player, radio, GPS devices, or any combination of the aforementioned, and other types of voice and text communications systems, can readily employ embodiments of the present invention. Furthermore, devices that are not mobile may also readily employ embodiments of the present invention.

In an exemplary embodiment, the network 30 includes a collection of various different nodes, devices or functions that are capable of communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like.

One or more communication terminals such as the mobile terminal 10 and the second communication device 20 may be in communication with each other via the network 30 and each may include an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing elements (e.g., personal computers, server computers or the like) may be coupled to the mobile terminal 10 and the second communication device 20 via the network 30. By directly or indirectly connecting the mobile terminal 10, the second communication device 20 and other devices to the network 30, the mobile terminal 10 and the second communication device 20 may be enabled to communicate with the other devices (or each other), for example, according to numerous communication protocols including Hypertext Transfer Protocol (HTTP) and/or the like, to thereby carry out various communication or other functions of the mobile terminal 10 and the second communication device 20, respectively.

Furthermore, although not shown in FIG. 1, the mobile terminal 10 and the second communication device 20 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 and the second communication device 20 may be enabled to communicate with the network 30 and each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an example embodiment, the service platform 40 may be a device or node such as a server or other processing element. The service platform 40 may have any number of functions or associations with various services. As such, for example, the service platform 40 may be a platform such as a dedicated server (or server bank) associated with a particular information source or service (e.g., a mapping service, a routing service and/or a map updating service), or the service platform 40 may be a backend server associated with one or more other functions or services. As such, the service platform 40 represents a potential host for a plurality of different services or information sources. In some embodiments, the functionality of the service platform 40 is provided by hardware and/or software components configured to operate in accordance with known techniques for the provision of information to users of communication devices. However, at least some of the functionality provided by the service platform 40 is information provided in accordance with embodiments of the present invention.

In an exemplary embodiment, the service platform 40 may include service provision circuitry 42 that hosts a service application 44 as described in greater detail below. The mobile terminal 10, the second communication device 20 and other devices may each represent sources for information that may be provided to the service platform 40 as well as potential recipients for information provided from the service platform 40. In some embodiments of the present invention, the service application 44 may be associated with a map updating service.

Figure 2:
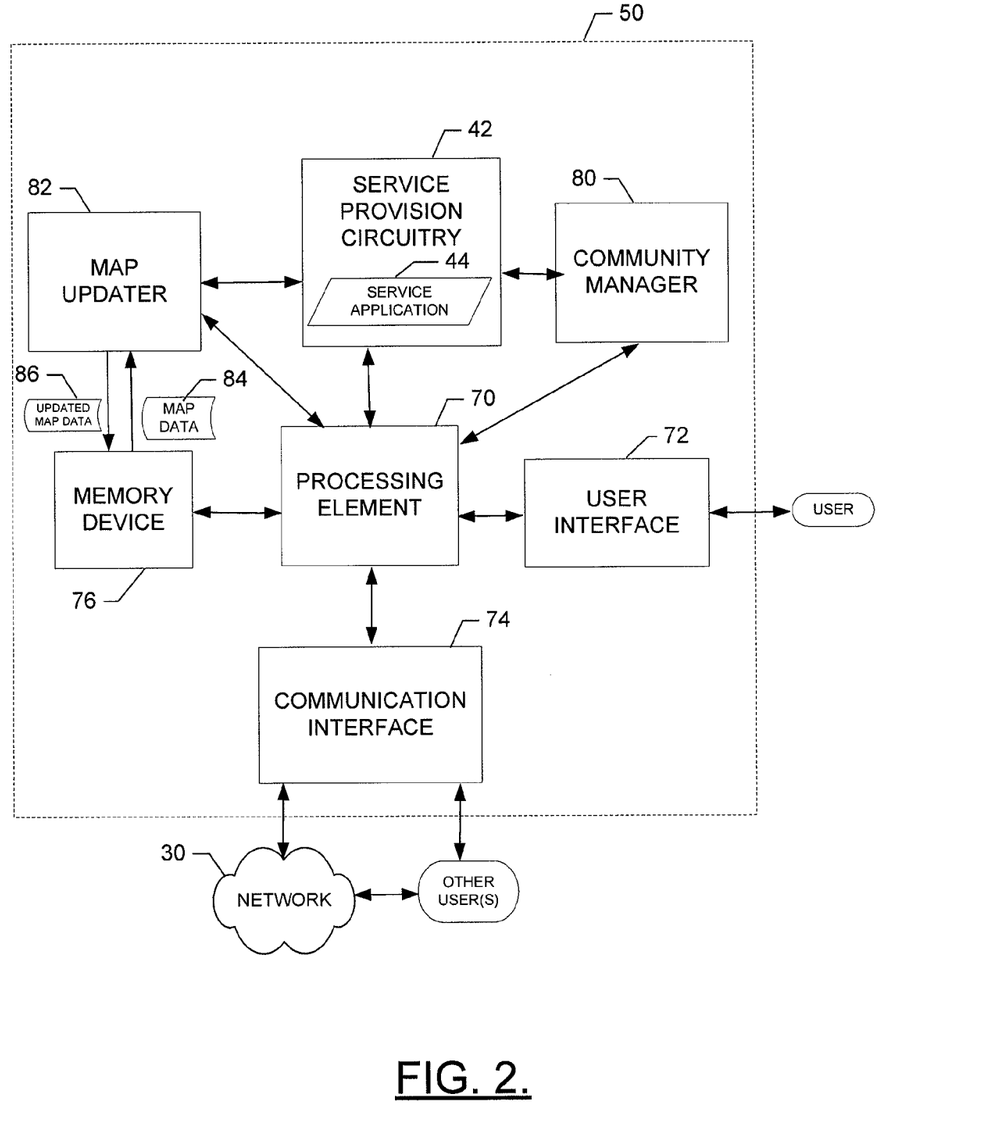
FIG. 2 illustrates a block diagram of an apparatus for enabling map updating using perpendicular projection to merge data according to an exemplary embodiment of the present invention.

FIG. 2 illustrates a schematic block diagram of an apparatus for employing community based user involvement in map updating according to an exemplary embodiment of the present invention. An exemplary embodiment of the invention will now be described with reference to FIG. 2, in which certain elements of an apparatus 50 for employing community based user involvement in map updating are displayed. The apparatus 50 of FIG. 2 may be employed, for example, on the service platform 40. However, the apparatus 50 may alternatively be embodied at a variety of other devices, both mobile and fixed (such as, for example, any of the devices listed above). In some cases, embodiments may be employed on a combination of devices. Accordingly, some embodiments of the present invention may be embodied wholly at a single device (e.g., the service platform 40), by a plurality of devices in a distributed fashion or by devices in a client/server relationship (e.g., the mobile terminal 10 and the service platform 40). Furthermore, it should be noted that the devices or elements described below may not be mandatory and thus some may be omitted in certain embodiments.

Referring now to FIG. 2, an apparatus for employing community based user involvement in map updating is provided. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, applications, instructions or the like. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content.

The processor 70 may be embodied in a number of different ways. For example, the processor 70 may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor 70 may be configured to execute instructions stored in the memory device 76 or otherwise accessible to the processor 70. As such, whether configured by hardware or software methods, or by a combination thereof, the processor 70 may represent an entity capable of performing operations according to embodiments of the present invention while configured accordingly.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen, a microphone, a speaker, or other input/output mechanisms. In an exemplary embodiment in which the apparatus is embodied as a server or some other network devices, the user interface 72 may be limited, remotely located, or eliminated.

In an exemplary embodiment, the processor 70 may be embodied as, include or otherwise control service provision circuitry 42. In this regard, for example, the service provision circuitry 42 includes structure for executing the service application 44. The service application 44 may be an application including instructions for execution of various functions in association with embodiments of the present invention. In an exemplary embodiment, the service application 44 includes or otherwise communicates with applications and/or circuitry for providing a mapping service. The mapping service may further include routing services and/or directory or look-up services related to a particular service point (e.g., business, venue, party or event location, address, site or other entity related to a particular geographic location and/or event). As such, the service application 44 may provide maps (e.g., via map data 84) to a remote user of or subscriber to the mapping service associated with the service application 44. In some cases, route guidance to specific locations on the map may be further provided and/or detailed information (e.g., address, phone number, email address, hours of operation, descriptions of services, and/or the like) about points of interest or businesses may be provided by the service application. Accordingly, the service provision circuitry 42 and the service application 44 may provide basic functionality for a mapping service (and/or guidance and directory services).

However, according to an exemplary embodiment, the service provision circuitry 42 and/or the service application 44 include and/or are in communication with additional devices or modules configured to enhance the basic mapping service to enable map updating as described herein. In this regard, for example, the processor 70 (e.g., via a map updater 82) may be configured to enable map updating using community based information as will be described in greater detail below.

In an exemplary embodiment, the processor 70 may be embodied as, include or otherwise control a community manager 80, and the map updater 82. The community manager 80 and the map updater 82 may each be any means such as a device or circuitry embodied in hardware, software or a combination of hardware and software (e.g., processor 70 operating under software control, the processor 70 embodied as an ASIC or FPGA specifically configured to perform the operations described herein, or a combination thereof) that is configured to perform the corresponding functions of the community manager 80 and the map updater 82, respectively, as described below.

In an exemplary embodiment, either or both of the community manager 80 and the map updater 82 may include instructions, code, modules, applications and/or circuitry for providing respective portions of community management and map updating services. However, it should be noted that code, circuitry and/or instructions associated with the community manager 80 and the map updater 82 need not necessarily be modular. In some embodiments, communication between the service provision circuitry 42, the community manager 80 and the map updater 82 is conducted via the processor 70. However, the service provision circuitry 42, the community manager 80 and the map updater 82 are alternatively in direct communication with each other. Furthermore, in some cases, the service provision circuitry 42 may include the community manager 80 and/or the map updater 82 as respective portions, devices or modules thereof.

In an exemplary embodiment, the community manager 80 is configured to receive update requests from individuals (e.g., from a user of the mobile terminal 10, the second communication device 20, or other devices) or other entities (e.g., from a network entity or from the map updater 82) requesting changes or updates to map data 84, and analyze the update requests. As such, persons noticing changes to features covered in a map, or network or service-related personnel reporting changes in features covered in the map, are enabled to notify the community manager 80 of the changes in order for community based verification of the changes to be accomplished as described herein. The update requests are received via the network 30 either wirelessly or via wireline communication. If the update requests are determined to be valid by the community manager 80, the community manager 80 may communicate the valid request(s) to the map updater 82 to enable the map updater 82 to update a corresponding map or maps from the map data 84. The community manager 80 may thereafter select recipients for receiving the updated maps that have been produced by the map updater 82. As such, in general terms, the community manager 80 according to some examples, manages the validation of map update requests for a community associated with a particular request and also manages distribution of information to the community if updates are made.

In some cases, the community manager 80 processes requests based on community feedback that the community manager 80 solicits from members of a community that is associated with or may be interested in the map data 84 for which an update was requested. In this regard, for example, if the requester is a member of a particular community (e.g., a subscriber to a particular service, member of a particular social network, club or group, and/or the like) the other members of the particular community may be solicited for feedback on the request. Alternatively, if the requester requests an update to a map area that a particular community is likely to be concerned about, the community manager 80 may seek feedback from members of the particular community. As yet another alternative, if the request is associated with a particular area, an ad hoc community including those parties who have recently been in the particular area or who frequently visit the particular area may be polled for information or feedback related to the request. In this regard, for example, position history information regarding individuals who are or recently were in a particular location may be used in determining an ad hoc community. As such, GPS trace information or other GPS sensor information may be used in determining community members. Other alternatives or combinations of the above examples are also possible. Thus, in some embodiments, the community includes registered members associated with a particular service. Alternatively or additionally, the community members may be active users of maps and/or associated with the location defined by areas or coordinates where such members are most often found or frequently travel to or near (e.g., driving, biking, walking, etc.). Accordingly, the community members may be viewed as trusted members of the community. In some cases, the community may be administered by a map provider or in other ways be linked to Internet associations.

Regardless of the makeup of the community (or whether or not the requester is a member of the community), the community manager 80 may be configured to inform community members of a received request and determine whether to validate the request based on the responses received from the community members informed. In this regard, for example, in response to receiving an update request identifying a particular map feature that is requested to be changed, modified or added, the community manager 80 may initially determine which map or maps of the map data 84 correspond to the update request (e.g., are affected by the update request if a change is made). Based on factors such as the map or maps affected (e.g., in relation to selecting a community associated with the affected map or maps), the community of the requester, the community of individuals recently or frequently in the area corresponding to the map or maps affected, the community of service subscribers, and/or the like, the community manager 80 may send out a poll question or otherwise indicate the nature of the proposed change associated with the update request. In some cases, an identity of the requester may be provided, but polls or other feedback solicitations may anonymously indicate the nature of the proposed change associated with the update request in other embodiments.

The community manager 80 may receive and analyze feedback or responses from the community members and make a determination as to the validity of the update request based on the received feedback or responses. Determinations regarding validity may be made in response to any suitable criteria. For example, a threshold number or percentage of positive responses (or acceptances) of an update request may be sufficient to enable the community manager 80 to determine that a particular update request is valid. Moreover, in some cases, a validity determination by the community manager 80 may not be made until a certain participation level is achieved. For example, in some situations, no determination regarding validity may be made until a minimum number or percentage of community members (or at least a minimum number or percentage of community members polled) have provided a response (positive or negative).

Other criteria could factor into validity determinations made by the community manager 80. For example, weighting factors could be assigned to the feedback provided by certain community members based on whether the respective community members have recently been to the area concerned (and therefore would likely have relevant experience) or how frequently the respective community members visit the area concerned (and therefore have an interest in maintaining maps for the area). As such, the community manager 80 may have access to position history information for community members in order to determine route preferences or habits of individuals that may be useful in identifying community members (e.g., for ad hoc location based community determinations), in identifying interested community members, and/or in identifying community members that are likely to be able to provide confirmation of changes requested for a particular area.

In some cases, the community manager 80 polls selected community members for each update request received. However, in other embodiments, the community manager 80 may be configured to wait to inform community members of an update request until a threshold or predetermined number of update requests regarding the same feature or area have been received from different users. By requiring more than one request for a particular update before informing community members of the request, the community manager 80 may prevent false alarms or incorrectly entered update requests from unnecessarily bothering community members.

In an exemplary embodiment, community members may also provide the community manager 80 (e.g., via user preferences indicated to or stored in a location accessible to the community manager 80) with an indication regarding receptiveness to receiving polls or feedback requests regarding update requests. As such, for example, a particular community member may indicate windows of time, or certain days or times during which the particular community member is either available or unavailable to receive polls, surveys or feedback requests. Similarly, community members may indicate particular areas for which they are sensitive to receiving polls, surveys or feedback requests when an update request is provided in connection with the particular areas.

In some embodiments, the community manager 80 determines a time table for issuing polls, surveys or feedback requests and updates based on the responses received. For example, the community manager 80 may issue surveys more quickly if a predetermined number of requests for a particular change are received over a relatively short time. Meanwhile, if a large or threshold number or percentage of responses confirming an update request is received, the community manager 80 may initiate updating and/or distribute updates more quickly or immediately. Other information may also be pertinent in relation to issuing surveys or updates. For example, whether an update request is received from a community member may be a factor used by the community manager 80. In this regard, for example, the community manager 80 may filter out or give lower weight to requests made or feedback given by non members of the community. Similarly, even if a requester or responder is a community member, the community manager 80 may consider the location of the community member in relation to evaluating the value of the community member's response to an update request in a particular location.

The community manager 80 may be configured to determine, based on the location associated with the update request, the nature of the update request, the preferences of community members and/or the community affiliation of the requester, whether and to whom polls or feedback requests regarding the update request are to be issued. For example, communities such as a New York cycling community may be interested in updates requests related to bike lane or roads, while a Boston jogging community may be interested in update requests that relate to roads and walking or jogging paths, but not in bike lanes. Furthermore, although a member of the New York cycling community may be interested in bike lane update requests, the member may not be interested in bike lane update requests in Boston. However, if the member of the New York cycling community has a planned trip to Boston next week, which is on the member's calendar, if the community manager 80 is aware of the member's plan (e.g., by having access to the calendar), the community manager 80 may provide bike lane updates and/or requests to the New York cycling community member during relevant periods (e.g., updates prior to and while the member is in the Boston area and update requests while the member is in the Boston area or shortly after the member has left the Boston area).

In an exemplary embodiment, the community manager 80 informs the map updater 82 to update the map data 84 in response to a valid update request. Thus, for example, in response to the threshold number or percentage of responses accepting or confirming an update request, the community manager 80 may provide an indication to the map updater 82 to enable or direct the map updater 82 to update the map data 84 accordingly. After the map updater 82 performs the requested changes or updates, the community manager 80 may provide updated information to selected individuals and/or selected maps (e.g., portions of the map data 84). The selected individuals may include all members of the community (e.g., all subscribers to the service or all individuals that are frequently (e.g., greater than a predetermined percentage (e.g., 80%) of the time) in the corresponding area), members of the community that are likely to be impacted by the change (e.g., New York members in a national cyclist club may not be informed of bike lane closures in Los Angeles) or perhaps only those members that approved or confirmed the update request.

As indicated above, the map updater 82 may be any means such as a device or circuitry embodied in hardware, software, or a combination of hardware and software that is configured to provide map updating based on received trace information from various sources. In this regard, for example, the map updater 82 may be configured to receive data from the community manager 80 indicating a location impacted by an update request and the nature of the update request, which may define map features to be updated. For example, the community manager 80 may provide an indication that a lane closure has been confirmed at a particular portion of a highway, or that a former one-way street is temporarily a two way street due to closure of an opposing one-way street. The map updater 82 may then retrieve a map or maps from the map data 84 that include the relevant highways or streets and update them accordingly.

In an exemplary embodiment, the map updater 82 may be configured to merge the prior map data 84 with the information provided by the community manager 80 in relation to the map feature or features to be updated. As such, for example, updates to the map data 84 (e.g., updated map data 86) may be provided as an overlay to the map data 84. Alternatively, updated map data 86 may replace portions of the map data 84 permanently. In some cases, the map updater 82 updates maps to provide the updated map data 86 that may replace the map data 84 either for all users accessing corresponding maps in the future (or for a predetermined time period), or for selected users (e.g., community members). As indicated above, the community manager 80 may handle distribution of the updated maps in some cases.

Figure 3A:
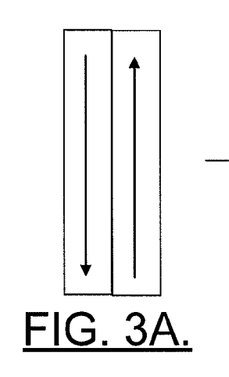
Figure 3B:
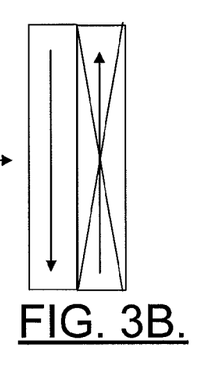

As an example, the map updater 82 may receive information (e.g., from the memory device 76) defining map data 84 that may be pre-existing from any source. The map data 84 may define various different roads, routes, paths, or the like. In some cases the map data 84 may further include information such as terrain features, construction features, points of interest, or other map features. The community manager 80 may further provide the map updater with an indication of the location and a feature to be modified. For example, FIG. 3 (which includes FIGS. 3A and 3B) shows map data for a two way street in FIG. 3A. Meanwhile, FIG. 3B provides one example of an update to the map data indicating that one direction of travel is blocked (e.g., that one lane is closed). When presented to users, updated map data may indicate the concept of a lane closure as shown in FIG. 3B. However, other mechanisms may also be provided. For example, color coding, text boxes, standard symbols (e.g., malfunctioning traffic light, lane under construction, accident, new location, new entrance, etc.) and other tools may be employed to indicate changes made to maps.

In an exemplary embodiment, the map data 84 may initially represent a map acquired or purchased from an existing map vendor or otherwise generated based on data gathered (or updated) at a particular point in time. Meanwhile, the updated map data 86 may represent map data that is generated subsequent to an incorporation of user data (e.g., update requests) received from one or more mobile users. As such, the updated map data 86 may incorporate actual data supplied by travelers and indicative of the routes traveled by the respective travelers. In some cases the map data 84 may itself include updated data (e.g., previously updated data). As such, the term "map data" may not necessarily imply that the map data has never been updated. Rather, the term "map data" should be understood to imply that there may be a more recently updated version (e.g., the updated map data 86).

In an exemplary embodiment, it may be useful to facilitate the entering of update requests in a somewhat standardized format, which may make handling of such requests easier. Thus, in some cases, the community manager 80 may be configured to communicate with an update application 90 (e.g., at the mobile terminal 10 or the second communication device 20) to provide the update application 90 with a format or form that the user of the update application 90 may fill in to provide a standard mechanism for creating update requests. In some embodiments, the update application 90 may be preconfigured with the standard mechanisms (e.g., forms).

In an exemplary embodiment, the update application 90 is provided with (e.g., from the community manager 80) or stores (e.g., in a memory of the mobile terminal 10) a form defining at least a location field and an update description field. The form may be accessible by pressing a particular button or hot key, or by selecting a menu option at the mobile terminal 10. The location field may be automatically filled in with the current location of the mobile terminal 10 (e.g., GPS coordinates) and/or the user may provide other text based location clues such as highway, intersection, or location names or a street address. In some cases, the form may be accessed by selecting an option after selecting a map location on the map. In such a case, the location may be filled in with the coordinates or address of the map location selected. In an alternative embodiment, after selecting a map location, the user may be provided with a display of numerous icons or symbols, each of which may correspond to a particular feature (e.g., lane closure, construction, accident, new restaurant or other point of interest, etc.), that may be selected by the user. The selected symbol, icon or feature may then be overlaid on the map at the corresponding location. As such, the survey from the community manager 80 that is provided to another terminal (e.g., the second communication device 20) may include a presentation of the overlay on the map. The other terminal may then review the overlay and be provided with a popup or other selection mechanism by which the user of the other terminal is enabled to provide an acceptance or confirmation of the overlay feature for communication to the community manager 80 for use in validity determinations as described above.

In an alternative embodiment, a user of the mobile terminal 10 (e.g., via the update application 90) may note a map error or a feature on a map that no longer reflects current conditions and may select a button, key or functional operator to initiate creation and submission of an update request. The user may then utilize a camera of the mobile terminal 10 (e.g., via camera module 137 in FIG. 4) to take a picture of the error or feature. The location of the mobile terminal 10 (e.g., determined via positioning sensor 136 of FIG. 4) may be recorded in association with the picture taken. The picture and coordinates may then be communicated to the community manager 80. The community manager 80 may provide an operator associated with the service platform 40 with an opportunity to review the picture and classify the update requested based on the picture. The community manager 80 may then survey community members based on the update request determined from the picture for the corresponding location.

Figure 4:
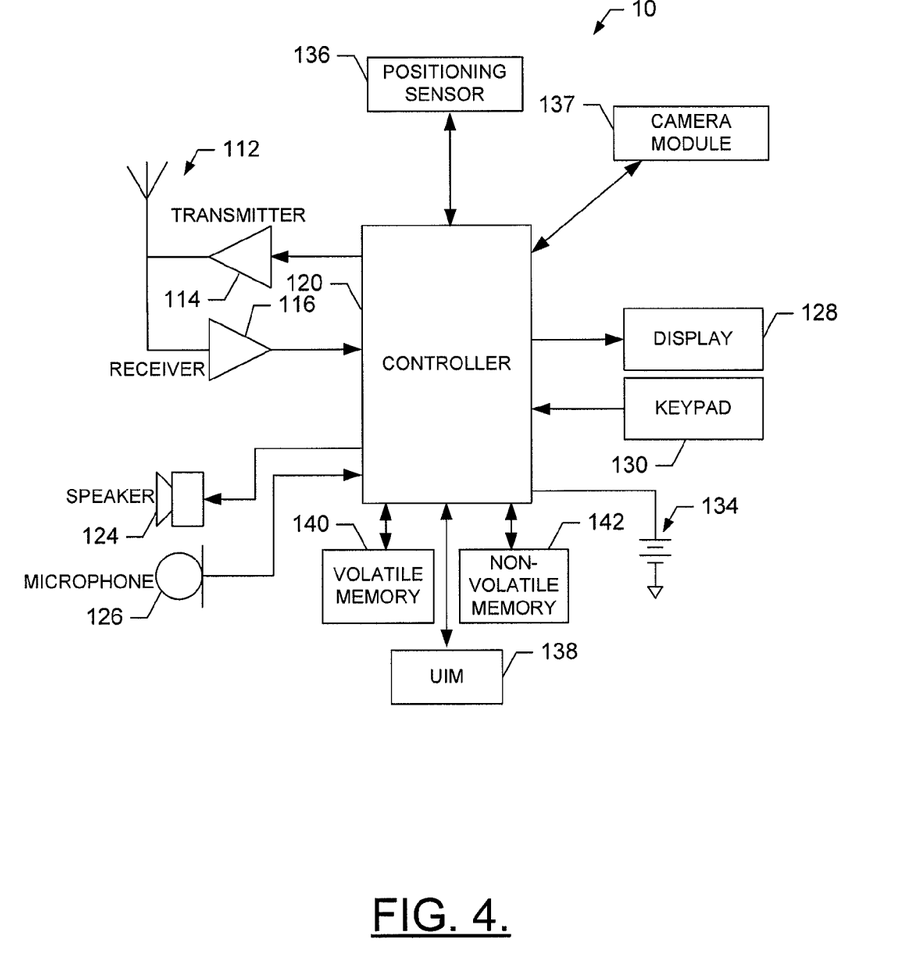
FIG. 4 is a schematic block diagram of a mobile terminal according to an exemplary embodiment of the present invention.

An example of a mobile device on which embodiments of the present invention may be utilized is shown in FIG. 4. In this regard, FIG. 4 illustrates a block diagram of one example of a mobile terminal 10 that may benefit from exemplary embodiments of the present invention. It should be understood, however, that a mobile terminal as illustrated and hereinafter described is merely illustrative of one type of mobile terminal that may benefit from some embodiments of the present invention and, therefore, should not be taken to limit the scope of embodiments of the present invention.

In one exemplary embodiment, the mobile terminal 10 includes an antenna 112 (or multiple antennas) in operable communication with a transmitter 114 and a receiver 116. The mobile terminal 10 may further include an apparatus, such as a controller 120 (e.g., a processor similar to that described above in FIG. 2) or other processing element, that provides signals to and receives signals from the transmitter 114 and receiver 116, respectively. The signals, in some cases, include signaling information in accordance with the air interface standard of the applicable cellular system, and/or may also include data corresponding to speech, received data and/or user generated/transmitted data.

In an exemplary embodiment, the controller 120 includes circuitry for implementing, among others, audio/video and logic functions of the mobile terminal 10. For example, the controller 120 may comprise a digital signal processor device, a microprocessor device, and various analog to digital converters, digital to analog converters, and/or other support circuits. Control and signal processing functions of the mobile terminal 10 may be allocated between these devices according to their respective capabilities. The controller 120 thus may also include the functionality to encode and interleave message and data prior to modulation and transmission. The controller 120 may additionally include an internal voice coder, and may include an internal data modem. In some cases, the controller 120 further includes functionality to operate one or more software programs, which may be stored in memory. For example, the controller 120 may be capable of operating a connectivity program, such as a conventional web browser. In an exemplary embodiment, the controller 120 is configured to execute the update application 90. The connectivity program may then allow the mobile terminal 10 to transmit and receive web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 124, a microphone 126, a display 128, and a user input interface, which may be operationally coupled to the controller 120. The user input interface, which allows the mobile terminal 10 to receive data, may include any of a number of devices allowing the mobile terminal 10 to receive data, such as a keypad 130, a touch display (not shown) or other input device. In embodiments including the keypad 130, the keypad 130 may include numeric (0-9) and related keys (#, *), and other hard and soft keys used for operating the mobile terminal 10. Alternatively, in some embodiments, the keypad 30 includes a QWERTY keypad arrangement. The keypad 130 may also include various soft keys with associated functions. In addition, or alternatively, the mobile terminal 10 may include an interface device such as a joystick or other user input interface. The mobile terminal 10 further includes a battery 134, such as a vibrating battery pack, for powering various circuits that are used to operate the mobile terminal 10, as well as optionally providing mechanical vibration as a detectable output.

In some embodiments, the mobile terminal 10 further includes a user identity module (UIM) 138. The UIM 138 is typically a memory device having a processor built in. The UIM 138 may include, for example, a subscriber identity module (SIM), a universal integrated circuit card (UICC), a universal subscriber identity module (USIM), a removable user identity module (R-UIM), etc. In some cases, the UIM 138 stores information elements related to a mobile subscriber. In addition to the UIM 138, the mobile terminal 10 may be equipped with memory. The mobile terminal 10 may include volatile memory 140 and/or non-volatile memory 142. For example, volatile memory 140 may include Random Access Memory (RAM) including dynamic and/or static RAM, on-chip or off-chip cache memory, and/or the like. Non-volatile memory 142, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 140 non-volatile memory 142 may include a cache area for temporary storage of data. The memories can store any of a number of pieces of information, and data, used by the mobile terminal 10 to implement the functions of the mobile terminal 10.

In addition, the mobile terminal 10 in some embodiments includes a positioning sensor 136. The positioning sensor 136 may include, for example, a global positioning system (GPS) sensor, an assisted global positioning system (Assisted-GPS) sensor, a Bluetooth (BT)-GPS mouse, other GPS or positioning receivers or the like. However, in one exemplary embodiment, the positioning sensor 136 may include a pedometer or inertial sensor. In this regard, the positioning sensor 136 may be capable of determining a location of the mobile terminal 10, such as, for example, longitudinal and latitudinal directions of the mobile terminal 10, or a position relative to a reference point such as a destination or start point. Information from the positioning sensor 136 may then be communicated to a memory of the mobile terminal 10 or to another memory device to be stored as a position history or location information.

In an exemplary embodiment, the mobile terminal 10 includes a media capturing module, such as a camera, video and/or audio module, in communication with the controller 120. The media capturing module may be any means for capturing an image, video and/or audio for storage, display or transmission. For example, in an exemplary embodiment in which the media capturing module is a camera module 137, the camera module 137 may include a digital camera capable of forming a digital image file from a captured image. As such, the camera module 137 may include all hardware, such as a lens or other optical device, and software necessary for creating a digital image file from a captured image.

Figure 5:
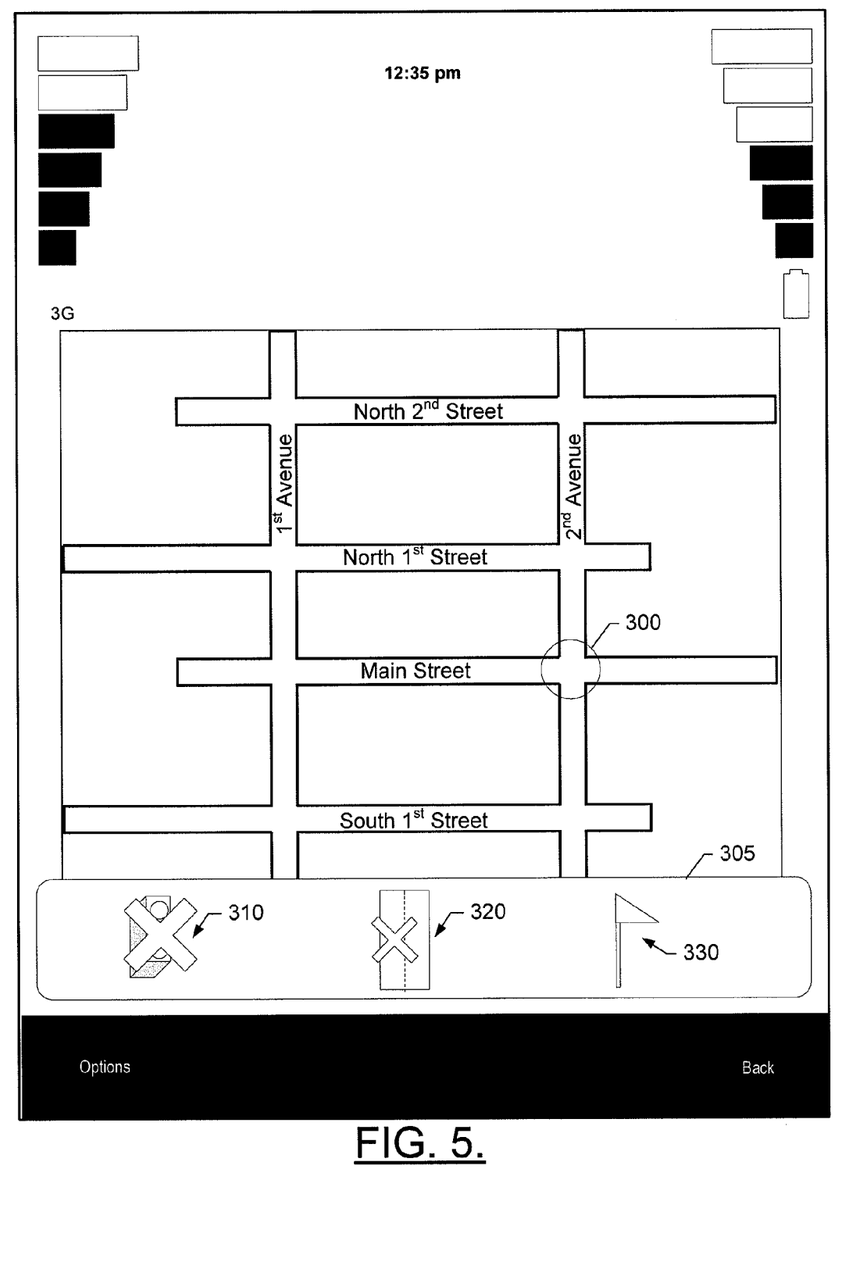
FIG. 5 illustrates an example of a map display with user interface options according to an exemplary embodiment of the present invention.

FIG. 5 illustrates an example of a map display with user interface options according to an exemplary embodiment of the present invention. In this regard, as shown in FIG. 5, a map may be displayed showing various map features. Although the example map displayed only shows roads, intersections and road names, other features such as points of interest, topographical features, route information, navigational aids, and/or the like may also be included. In this example, a portion of the map corresponding to an update request may be highlighted as shown by selection window 300. The selection window 300 could be positioned by positioning a cursor using a joystick, mouse, finger or stylus on a touch screen, or any other suitable screen navigation device and thereafter selecting the corresponding portion of the map. In one example, as shown in FIG. 5, after selecting a map portion, icons may be presented in an update request selection window 305. Although three example icons are shown in FIG. 5 (e.g., a malfunctioning traffic light icon 310, a lane closure icon 320 and a point of interest icon 330) any number of icons could additionally or alternatively be presented (e.g., a gate symbol for restricted access areas and various logos or brand symbols to indicate specific information about a point of interest). In response to selection of one of the icons, an update request corresponding to the selected icon may be communicated to the service platform 40 in association with the selected location. In some cases, instead of icons, the update request selection window 305 may include a listing of selectable text descriptions of commonly encountered potential updates. Additionally or alternatively, a field may be provided for text entry of the update request.

Thus, according to some embodiments, predefined update information may be provided (e.g., in the update request selection window 305) to expedite or otherwise assist in update request generation at the device of the requester. As another alternative, rather than showing the update request selection window 305 as an overlay to the map data or at an unused portion of a display screen showing the map data, selection of the portion of the map that is to be the subject of an update request may shift the display to showing a page dedicated to update request related data entry. As such, a much larger listing of options for geographic features may be presented and fields or other opportunities for entering more detailed information about a particular update request may therefore be provided. In some cases, the dedicated page may be entered when a particular icon or update option is selected so that the dedicated page may be specific to the type of update requested. As such, for example, detailed information on a particular point of interest's corresponding hours of operation, telephone number, email address, street address or other like information may be more easily provided in corresponding fields. Furthermore, in some embodiments, images can be opened and/or selected from a look-up list of images on the dedicated page. Accordingly, a selected image could be provided to the service platform 40 along with information such as the map provider address, an icon identifier, location identification (e.g., received from the real location of the user on the map application), and/or the like. In some cases, an identity of the user submitting the update request is also added so that the membership status of the user in relation to the may be indicated to receivers of the update request.

Figure 6:
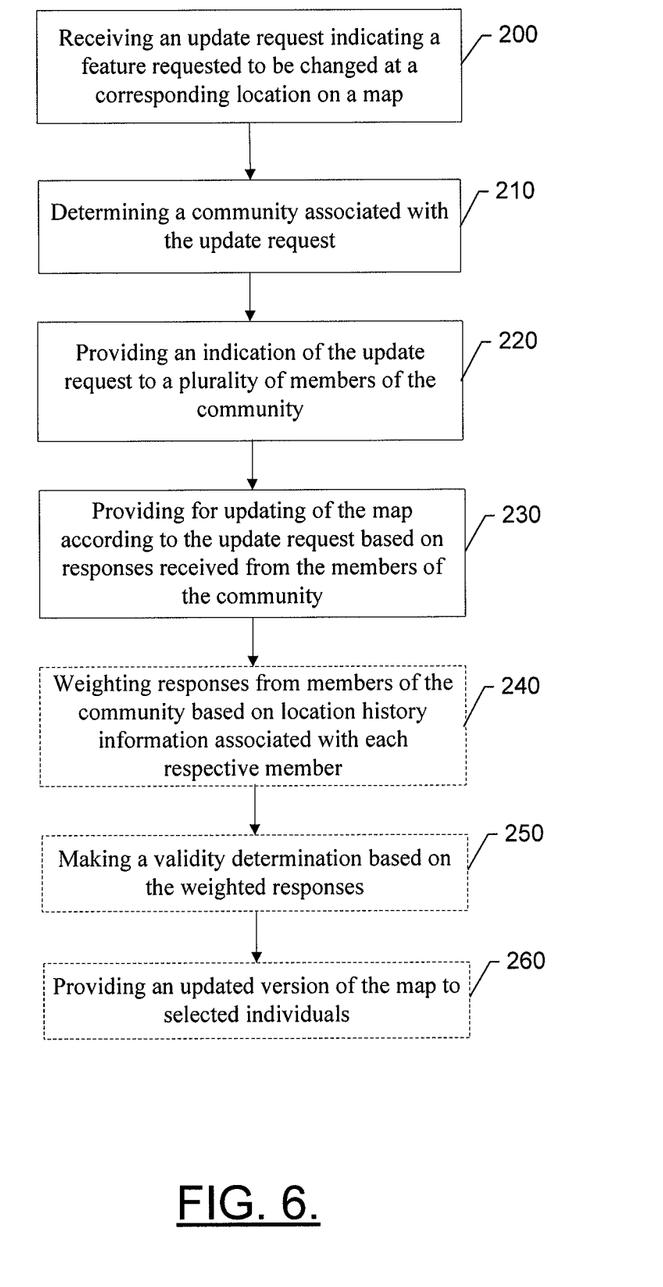
FIG. 6 is a flowchart according to an exemplary method for employing community based user involvement in map updating and FIG. 7 is a flowchart according to another exemplary method for employing community based user involvement in map updating according to an exemplary embodiment of the present invention.
Figure 7:
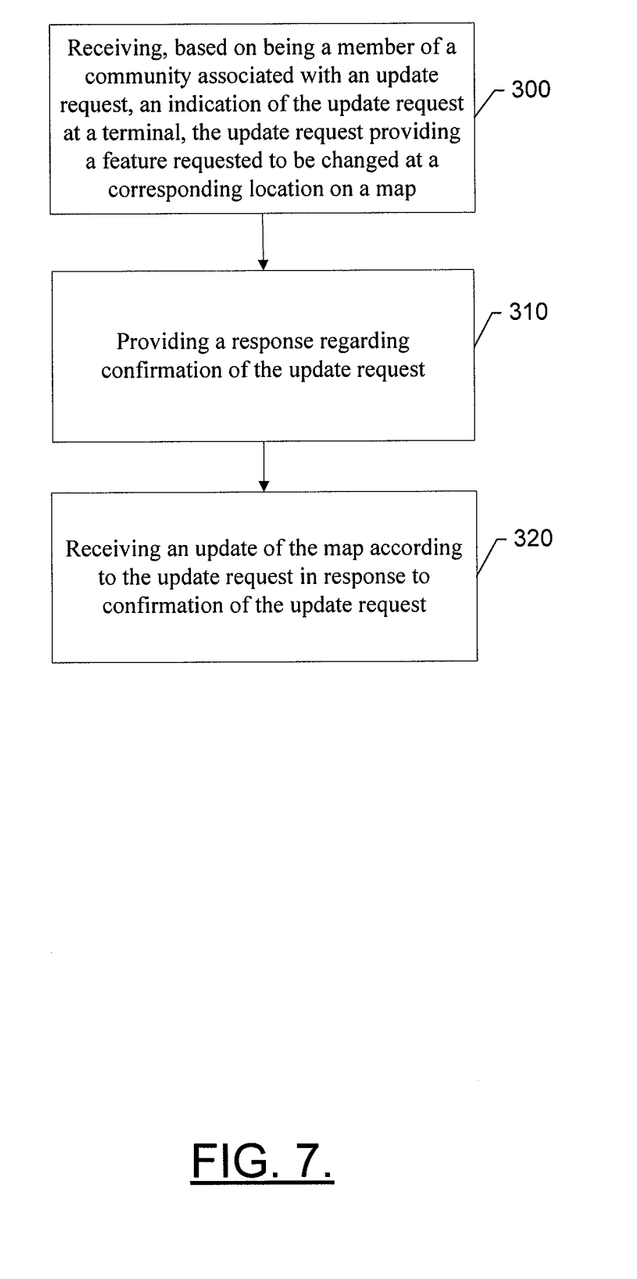

FIGS. 6 and 7 are flowcharts of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal or network device and executed by a built-in processor in the mobile terminal or network device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for employing community based user involvement in map updating from a network entity's perspective as illustrated, for example, in FIG. 6 includes receiving an update request indicating a feature requested to be changed at a corresponding location on a map at operation 200, determining a community associated with the update request at operation 210, providing an indication of the update request to a plurality of members of the community at operation 220, and providing for updating of the map according to the update request based on responses received from the members of the community at operation 230.

In some embodiments, the method may include further optional operations, some examples of which are shown in dashed lines in FIG. 6. Optional operations may be performed in any order and/or in combination with each other in various alternative embodiments. As such, the method may further include an operation of weighting responses from members of the community based on location history information associated with each respective member at operation 240, and making a determination of validity based on the weighted responses at operation 250. In some other embodiments, the method additionally or alternatively includes providing an updated version of the map to selected individuals at operation 260.

In some embodiments, certain ones of the operations above may be modified or further amplified as described below. It should be appreciated that each of the modifications or amplifications below may be included with the operations above either alone or in combination with any others among the features described herein. In this regard, for example, determining a community associated with the update request may include determining the community based at least in part on the location of the update request or on the feature requested to be changed in the update request. In some cases, providing for updating the map may include enabling the alteration of map data corresponding to the location to reflect the feature requested to be changed in response to a determination that the responses received indicate validity of the update request. In an exemplary embodiment, providing the indication of the update request includes providing an overlay on the map in which the overlay indicates the feature requested to be changed. In another exemplary embodiment, receiving the update request may include receiving an image of the feature in which the image is associated with location information assigned based on a location of a device capturing the image.

In an exemplary embodiment, an apparatus for performing the method of FIG. 6 above may comprise a processor (e.g., the processor 70) configured to perform some or each of the operations (200-260) described above. The processor may, for example, be configured to perform the operations (200-260) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-260 may comprise, for example, the processor 70, the community manager 80, the map updater 82, and/or an algorithm executed by the processor 70 for processing information as described above.

In another exemplary embodiment, a method for employing community based user involvement in map updating from a mobile terminal's perspective as illustrated, for example, in FIG. 7 includes receiving, based on being a member of a community associated with an update request, an indication of the update request at a terminal, the update request providing a feature requested to be changed at a corresponding location on a map at operation 300, providing a response regarding confirmation of the update request at operation 310, and receiving an update of the map according to the update request in response to confirmation of the update request at operation 320.

In some embodiments, certain ones of the operations above may be modified or further amplified as described below. It should be appreciated that each of the modifications or amplifications below may be included with the operations above either alone or in combination with any others among the features described herein. In this regard, for example, receiving the indication may include receiving an overlay on the map in which the overlay indicates the feature requested to be changed. In another example, providing the response may include selecting one of a positive response confirming the update request or a negative response rejecting the update request In an exemplary embodiment, an apparatus for performing the method of FIG. 7 above may comprise a processor (e.g., the controller 20) configured to perform some or each of the operations (300-320) described above. The processor may, for example, be configured to perform the operations (300-320) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-320 may comprise, for example, the processor 70, the update application 90, and/or an algorithm executed by the controller 20 for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:
1. A method comprising:
receiving, at an apparatus, an update request indicating a feature requested to be changed at a corresponding location on a map;
receiving coordinate data for a plurality of members, each member having a user device including a GPS sensor providing corresponding coordinate data;
determining, from said plurality of members, a community of members associated with the update request, each respective member of the community of members having visited or currently visiting the corresponding location and determined based on said received coordinate data;
providing an indication of the update request to said each respective member of the community of members;
weighting, by a processor, one or more responses received from said each respective member of the community of members based upon location visiting history information associated with said each respective member of the community of members and determined based on said received coordinate data;
updating the map when a first threshold number of the community of members that are provided the indication of the update request provide the one or more responses and when the weighted one or more responses indicate that acceptance of the update request by the community of members is a second threshold number; and sending an updated version of the map from a communication interface of the apparatus to selected communication devices via a communication network, wherein the weighting is based, at least in part, on how frequently said each respective member of the community of members has visited the corresponding location and determined based on said received coordinate data.

2. A method according to claim 1, wherein determining the community of members associated with the update request comprises determining the community of members based on the location of the update request.

3. A method according to claim 1, wherein determining the community of members associated with the update request comprises determining the community of members based on the feature requested to be changed in the update request.

4. A method according to claim 1, wherein providing for updating the map comprises enabling the alteration of map data corresponding to the location to reflect the feature requested to be changed in response to a determination that the one or more responses received indicate validity of the update request.

5. A method according to claim 1, wherein providing the indication of the update request comprises providing an overlay on the map, the overlay indicating the feature requested to be changed.

6. A method according to claim 1, wherein receiving the update request comprises receiving an image of the feature in which the image is associated with location information assigned based on a location of a device capturing the image.

7. A method according to claim 1, wherein said each respective member of the community of members is determined as having visited or currently visiting the corresponding location based upon global positioning system data of an associated device.

8. A method according to claim 1, wherein said each respective member of the community of members is determined as having visited or currently visiting the corresponding location based upon membership to an establishment using the corresponding location.

9. A non-transitory computer-readable storage medium carrying one or more sequences of one or more instructions which, when executed by one or more processors, cause an apparatus to at least perform the following steps:

receiving an update request indicating a feature requested to be changed at a corresponding location on a map;

receiving coordinate data for a plurality of members, each member having a user device including a GPS sensor providing corresponding coordinate data;

determining, from said plurality of members, a community of members associated with the update request, each respective member of the community of members having visited or currently visiting the corresponding location and determined based on said received coordinate data;

providing an indication of the update request to said each respective member of the community of members;

weighting one or more responses received from said each respective member of the community of members based upon location visiting history information associated with said each respective member of the community of members and determined based on said received coordinate data;

updating the map when a first threshold number of the community of members that are provided the indication of the update request provide the one or more responses and when the weighted one or more responses indicate that acceptance of the update request by the community of members is a second threshold number; and sending an updated version of the map from a communication interface of the apparatus to selected communication devices via a communication network, wherein the weighting is based, at least in part, on how frequently said each respective member of the community of members has visited the corresponding location and determined based on said received coordinate data.

10. A non-transitory computer-readable storage medium according to claim 9, wherein the apparatus is caused to further perform:

determining the community of members associated with the update request includes instructions for determining the community of members based on the location of the update request.

11. A non-transitory computer-readable storage medium according to claim 9, wherein the apparatus is caused to further perform:

determining the community of members associated with the update request includes instructions for determining the community of members based on the feature requested to be changed in the update request.

12. A non-transitory computer-readable storage medium according to claim 9, wherein the apparatus is caused to further perform:

providing for updating the map includes instructions for enabling the alteration of map data corresponding to the location to reflect the feature requested to be changed in response to a determination that the one or more responses received indicate validity of the update request.

13. A non-transitory computer-readable storage medium according to claim 9, wherein the apparatus is caused to further perform:

providing the indication of the update request includes instructions for providing an overlay on the map, the overlay indicating the feature requested to be changed.

14. An apparatus comprising:

at least one processor; and at least one memory including computer program code for one or more programs, the at least one memory and the computer program code configured to, with the at least one processor, cause the apparatus to perform at least the following, receive an update request indicating a feature requested to be changed at a corresponding location on a map;

receive coordinate data for a plurality of members, each member having a user device including a GPS sensor providing corresponding coordinate data;

determine a community of members associated with the update request, each respective member of the community of members having visited or currently visiting the corresponding location and determined based on said received coordinate data;

provide an indication of the update request to said each respective member of the community of members;

weight one or more responses received from said each respective member of the community of members based upon location visiting history information associated with said each respective member of the community of members and determined based on said received coordinate data;

update the map when a first threshold number of the community of members that are provided the indication of the update request provide the one or more responses and when the weighted one or more responses indicate that acceptance of the update request by the community of members is a second threshold number; and send an updated version of the map from a communication interface of the apparatus to selected communication devices via a communication network, wherein the weighting is based, at least in part, on how frequently said each respective member of the community of members has visited the corresponding location and determined based on said received coordinate data.

15. An apparatus according to claim 14, wherein apparatus is further caused to:

determine the community of members associated with the update request by determining the community of members based on the location of the update request.

16. An apparatus according to claim 14, wherein the apparatus is further caused to:

determine the community of members associated with the update request by determining the community of members based on the feature requested to be changed in the update request.

17. An apparatus according to claim 14, wherein the apparatus is further caused to:

provide for updating the map by enabling the alteration of map data corresponding to the location to reflect the feature requested to be changed in response to a determination that the one or more responses received indicate validity of the update request.

18. An apparatus according to claim 14, wherein the apparatus is further caused to:

provide the indication of the update request by providing an overlay on the map, the overlay indicating the feature requested to be changed.

* * * * *